US009219526B2

(12) United States Patent
Du et al.

(10) Patent No.: US 9,219,526 B2
(45) Date of Patent: Dec. 22, 2015

(54) CHANNEL SELECTION IN POWER LINE COMMUNICATIONS

(71) Applicant: Texas Instruments Incorporated, Dallas, TX (US)

(72) Inventors: Shu Du, San Jose, CA (US); Anand G. Dabak, Plano, TX (US); Xiaolin Lu, Plano, TX (US); Il Han Kim, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/630,990

(22) Filed: Feb. 25, 2015

(65) Prior Publication Data

US 2015/0171922 A1    Jun. 18, 2015

Related U.S. Application Data

(62) Division of application No. 13/363,391, filed on Feb. 1, 2012, now Pat. No. 8,995,461.

(60) Provisional application No. 61/440,576, filed on Feb. 8, 2011.

(51) Int. Cl.
| | |
|---|---|
| *H04B 3/54* | (2006.01) |
| *H04L 12/10* | (2006.01) |
| *H04L 12/26* | (2006.01) |
| *H04L 7/00* | (2006.01) |

(52) U.S. Cl.
CPC .............. *H04B 3/54* (2013.01); *H04B 3/544* (2013.01); *H04L 7/00* (2013.01); *H04L 12/10* (2013.01); *H04L 43/0823* (2013.01); *H04B 2203/5408* (2013.01); *H04B 2203/5466* (2013.01); *H04B 2203/5495* (2013.01)

(58) Field of Classification Search
None
See application file for complete search history.

(56) References Cited

U.S. PATENT DOCUMENTS

| | | | | |
|---|---|---|---|---|
| 7,764,943 | B2* | 7/2010 | Radtke | 455/402 |
| 7,885,633 | B2* | 2/2011 | Schwager et al. | 455/402 |
| 2003/0038710 | A1* | 2/2003 | Manis et al. | 340/310.01 |
| 2005/0035850 | A1* | 2/2005 | Schwager et al. | 340/310.01 |
| 2006/0268705 | A1* | 11/2006 | Kurobe et al. | 370/230 |
| 2007/0076505 | A1* | 4/2007 | Radtke et al. | 365/222 |
| 2007/0135085 | A1* | 6/2007 | Iwamura | 455/402 |
| 2010/0111199 | A1* | 5/2010 | Sharma | 375/257 |
| 2012/0134430 | A1* | 5/2012 | Li et al. | 375/260 |
| 2012/0246331 | A1* | 9/2012 | Heller et al. | 709/230 |

* cited by examiner

*Primary Examiner* — Donald Mills
(74) *Attorney, Agent, or Firm* — Steven A. Shaw; Charles A. Brill; Frank D. Cimino

(57) ABSTRACT

Systems for channel selection in power line communications (PLC) are described. In some embodiments, a PLC device may include a processor and a memory. The memory stores instructions executable by the processor to cause the PLC device perform operations. One or more time slots in each of a plurality of frequency bands are sequentially scanned. A packet transmitted by a second PLC device to the PLC device over one of the plurality of frequency bands is detected. Additional packets received from the second PLC device are synchronized across the plurality of frequency bands based, at least in part, upon the detected packet. The additional packets are organized in a plurality of frames. Each of the plurality of frames having been transmitted by the second PLC device to the PLC device over a respective one of the plurality of frequency bands. Each frame has a plurality of time slots, and each time slot has a pair of beacon and band-scan packets.

6 Claims, 10 Drawing Sheets

CHANNEL SELECTION IN POWER LINE COMMUNICATIONS

CROSS-REFERENCE TO RELATED APPLICATION

This application is a Divisional of and claims priority to U.S. Patent application Ser. No. 13/363,391 filed Feb. 10, 2012 which claims the benefit of the filing date of U.S. Provisional Patent Application No. 61/440,576 titled "Automatic Channel Scan Algorithm" and filed Feb. 8, 2011, the disclosure of which is hereby incorporated by reference herein in its entirety.

TECHNICAL FIELD

This specification is directed, in general, to power line communications, and, more specifically, to systems and methods of channel selection in power line communications.

BACKGROUND

Power line communications (PLC) include systems for communicating data over the same medium (i.e., a wire or conductor) that is also used to transmit electric power to residences, buildings, and other premises. Once deployed, PLC systems may enable a wide array of applications, including, for example, automatic meter reading and load control (i.e., utility-type applications), automotive uses (e.g., charging electric cars), home automation (e.g., controlling appliances, lights, etc.), and/or computer networking (e.g., Internet access), to name only a few.

Various PLC standardizing efforts are currently being undertaken around the world, each with its own unique characteristics. Generally speaking, PLC systems may be implemented differently depending upon local regulations, characteristics of local power grids, etc. Examples of competing PLC standards include the IEEE 1901, HomePlug AV, and ITU-T G.hn (e.g., G.9960 and G.9961) specifications. Another standardization effort includes, for example, the Powerline-Related Intelligent Metering Evolution (PRIME) standard designed for OFDM-based (Orthogonal Frequency-Division Multiplexing) communications.

SUMMARY

Systems and methods for channel selection in power line communications (PLC) are described. In an illustrative, non-limiting embodiment, a method may include performing, by a first PLC device, defining a plurality of frames, each of the plurality of frames having a plurality of time slots. The method may also include performing, by the first PLC device, assembling a pair of beacon and bandscan packets within each of the plurality of time slots in each of the plurality of frames. The method may further include performing, by the first PLC device, sequentially transmitting each of the plurality of frames in a corresponding one of a plurality of different frequency bands to a second PLC device over a power line.

For example, the first PLC device may include a PLC modem. The beacon packets may be configured to inform the second PLC device that the first PLC device is active. Each bandscan packet may include a slot index indicating a position of its time slot within its respective frame. Each bandscan packet may also include a band index indicating one of the plurality of different frequency bands. In addition, each bandscan packet may include information indicating a frequency band distinct from any of the plurality of different frequency bands to be used by the second PLC device to communicate with the first PLC device in a direction from the second PLC device to the first PLC device. In some cases, the information may include signal-to-noise ratio (SNR) and/or bit error rate (BER) information.

In some implementations, the method may include performing, by the first PLC device and in response to having transmitted the plurality of frames, receiving one or more packets from the second PLC device indicating a selection of one or more of the plurality of different frequency bands to be used in a communication between the first PLC device and the second PLC device in a direction from the first PLC device to the second PLC device. In other implementations, the method may also include performing, by the first PLC device and in response to having transmitted the plurality of frames, receiving one or more packets from the second PLC device indicating a signal-to-noise ratio (SNR) or bit error rate (BER) measurement made by the second PLC device in each of the plurality of different frequency bands. In the latter case, the method may further include selecting one or more of the plurality of different frequency bands to be used in a communication between the first PLC device and the second PLC device in a direction from the first PLC device to the second PLC device based, at least in part, upon the SNR or BER measurements.

In another illustrative, non-limiting embodiment, a method may include performing, by a PLC device, sequentially scanning one or more time slots in each of a plurality of frequency bands, detecting a packet transmitted by a second PLC device to the PLC device over one of the plurality of frequency bands, and synchronizing additional packets received from the second PLC device across the plurality of frequency bands based, at least in part, upon the detected packet, wherein the additional packets are organized in a plurality of frames, each of the plurality of frames having been transmitted by the second PLC device to the PLC device over a respective one of the plurality of frequency bands, each frame having a plurality of time slots, and each time slot having a pair of beacon and bandscan packets.

For example, the beacon packets may be configured to inform the PLC device that the second PLC device is active. In addition, each bandscan packet may include a slot index indicating a position of its time slot within its respective frame and/or a band index indicating a corresponding one of the plurality of frequency bands. The method may also include calculating a channel quality metric for each of the plurality of frequency bands based, at least in part, upon respective ones of the plurality of frames. For instance, the channel quality metric may include a signal-to-noise ratio (SNR) or bit error rate (BER) calculation or estimation.

In some implementations, the method may include transmitting one or more packets to the second PLC device, each of the one or more packets corresponding to one of the plurality of time slots, and each of one or more packets including an indication of the channel quality metric. In that regard, the method may include determining when to transmit the one or more packets to the second PLC device based upon at least one of: a round-robin or a carrier sense multiple access (CSMA) technique.

In yet another illustrative, non-limiting embodiment, a method may include performing, by a first PLC modem and in a first mode of operation, defining a plurality of frames, each of the plurality of frames having a plurality of time slots, assembling a pair of beacon and bandscan packets within each of the plurality of time slots in each of the plurality of frames, and sequentially transmitting each of the plurality of frames over a corresponding one of a first plurality of frequency bands to a second PLC modem over a power line. In a second mode of operation, the method may include performing, by the first PLC modem, monitoring one or more time slots in each of a second plurality of frequency bands over the power line, the second plurality of frequency bands different from the first plurality of frequency bands, detecting a packet transmitted by the second PLC modem over one of the second plurality of frequency bands, synchronizing receipt of additional packets transmitted by the second PLC modem across the second plurality of frequency bands based, at least in part, upon the detected packet, calculating a channel quality value for each of the second plurality of frequency bands based, at least in part, upon the additional packets, and selecting one or more of the second plurality of frequency bands for subsequent communications with the second PLC modem in a direction from the second PLC modem to the first PLC modem based, at least in part, upon the channel quality values.

In the first mode of operation, the method may also include receiving a communication from the second PLC modem indicating one or more of the first plurality of frequency bands to be used in subsequent communications with the second PLC modem in a direction from the first PLC modem to the second PLC modem. In the second mode of operation, the method may further include communicating the selected one or more of the second plurality of frequency bands to the second PLC modem over each of the second plurality of frequency bands, the selected one or more of the second plurality of frequency bands to be used in subsequent communications with the PLC modem in a direction from the second PLC modem to the first PLC modem.

In some implementations, one or more PLC devices or computer systems may perform one or more of the techniques described herein. In other implementations, a tangible computer-readable or electronic storage medium may have program instructions stored thereon that, upon execution by one or more PLC devices or computer systems, cause the one or more PLC devices or computer systems to execute one or more operations disclosed herein. In yet other implementations, a PLC system (e.g., a PLC modem) may include at least one processor and a memory coupled to the at least one processor. Examples of a processor include, but are not limited to, a digital signal processor (DSP), an application specific integrated circuit (ASIC), a system-on-chip (SoC) circuit, a field-programmable gate array (FPGA), a microprocessor, or a microcontroller. The memory may be configured to store program instructions executable by the at least one processor to cause the system to execute one or more operations disclosed herein.

BRIEF DESCRIPTION OF THE DRAWINGS

Figure 1:
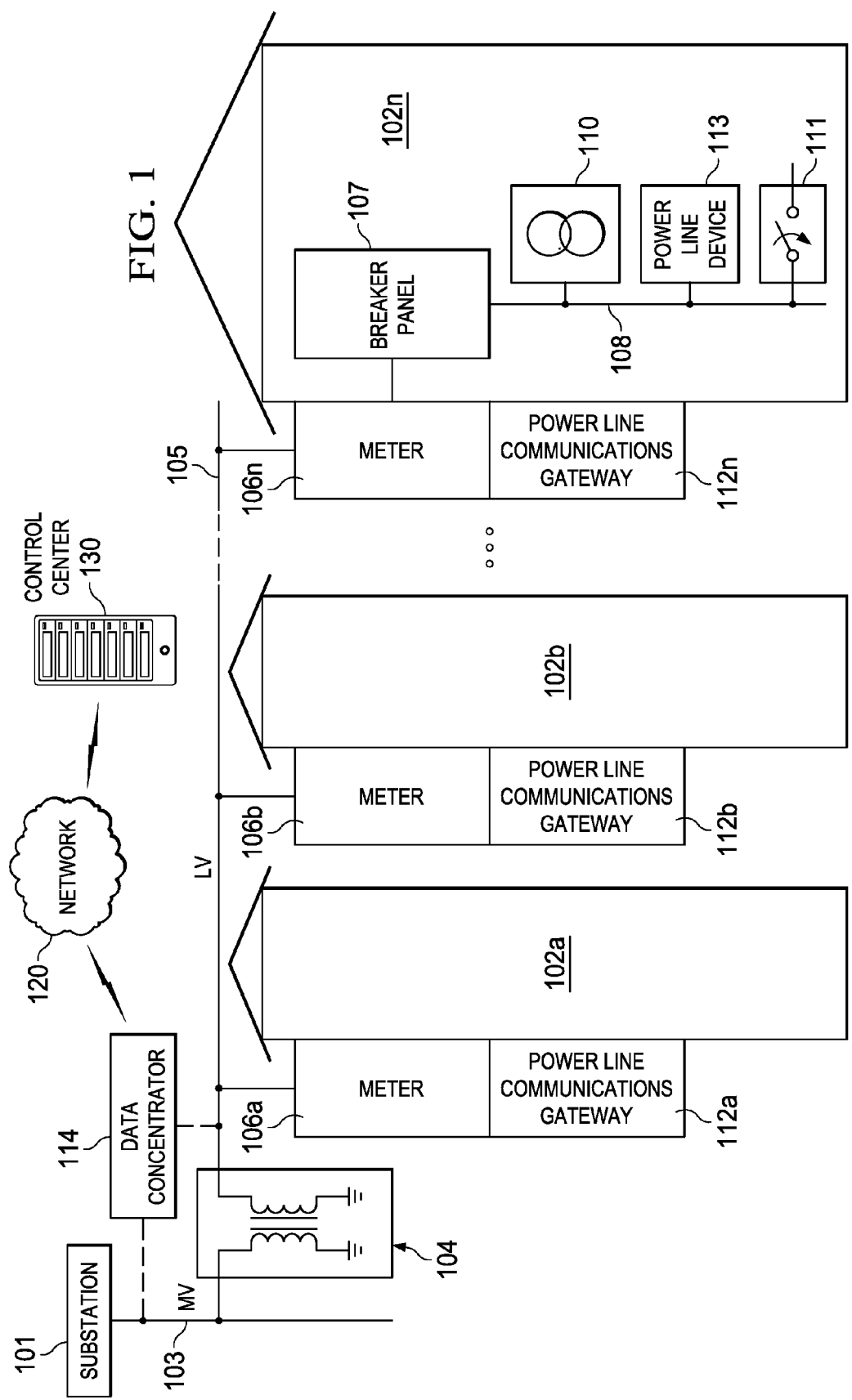

Having thus described the invention(s) in general terms, reference will now be made to the accompanying drawings, wherein:

FIG. 1 is a block diagram of a power line communication (PLC) environment according to some embodiments.

Figure 2:
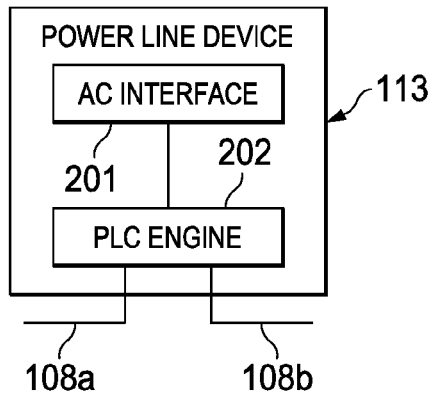

FIG. 2 is a block diagram of a PLC device or modem according to some embodiments.

Figure 3:
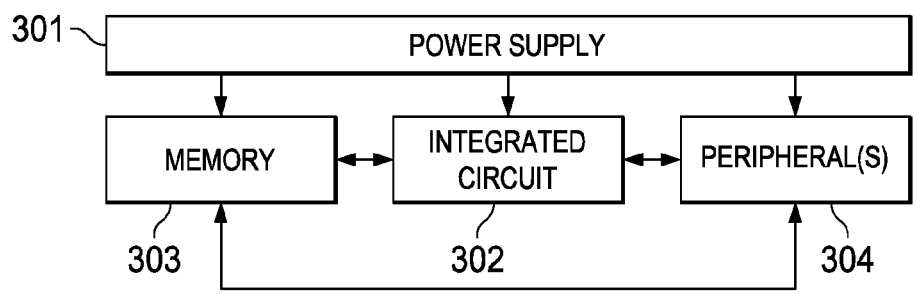

FIG. 3 is a block diagram of an integrated circuit according to some embodiments.

Figure 4:
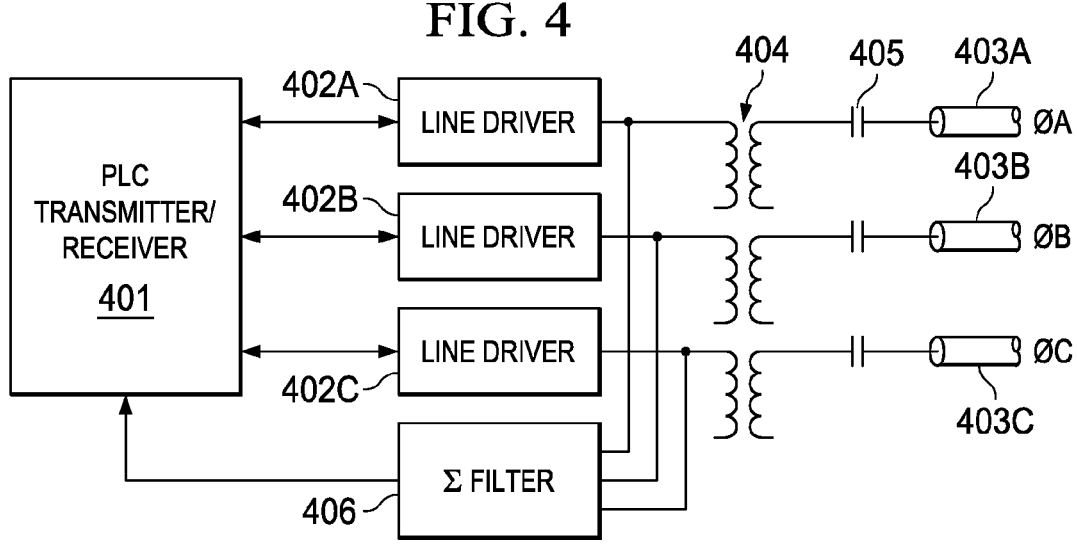
Figure 5:
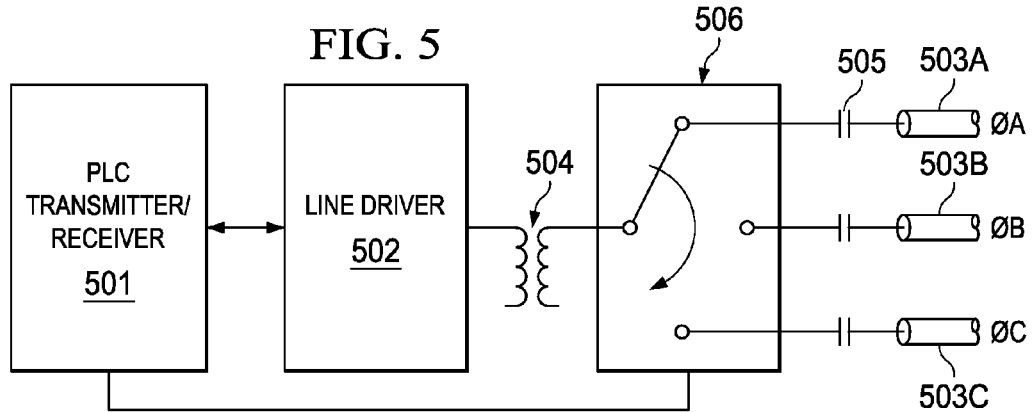
Figure 6:
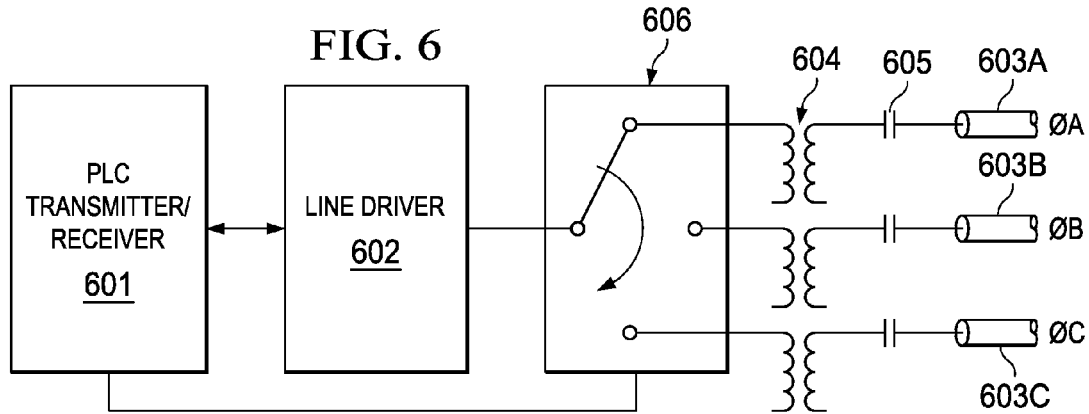

FIGS. 4-6 are block diagrams illustrating connections between a PLC transmitter and/or receiver circuitry to three-phase power lines according to some embodiments.

Figure 7:
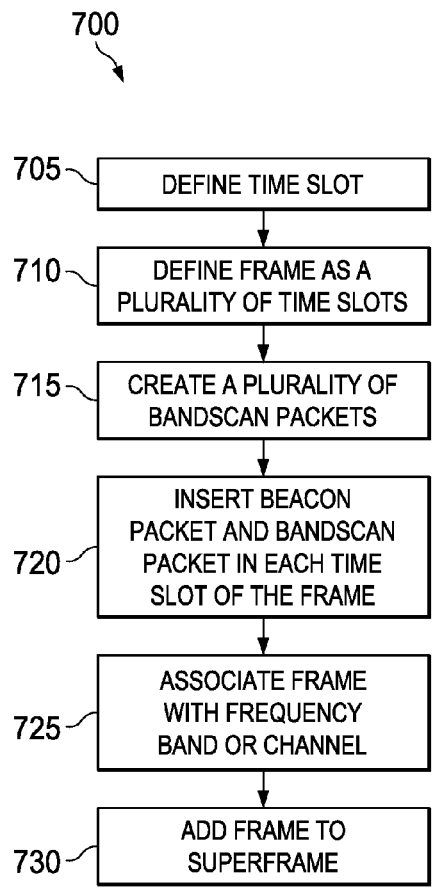

FIG. 7 is a flowchart of a method for creating a superframe according to some embodiments.

Figures 8, 10:
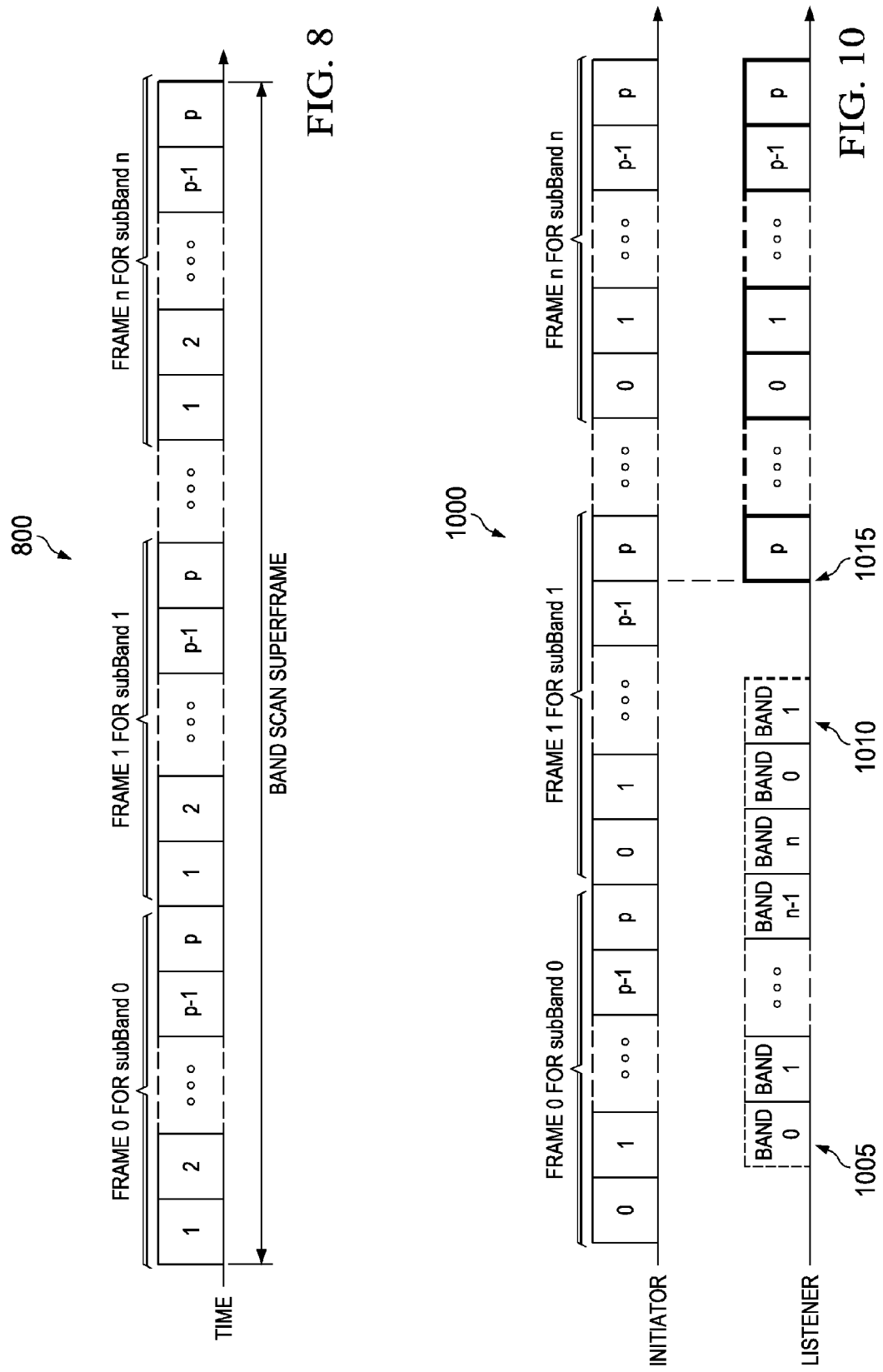

FIG. 8 is a diagram of a superframe according to some embodiments.

Figure 9:
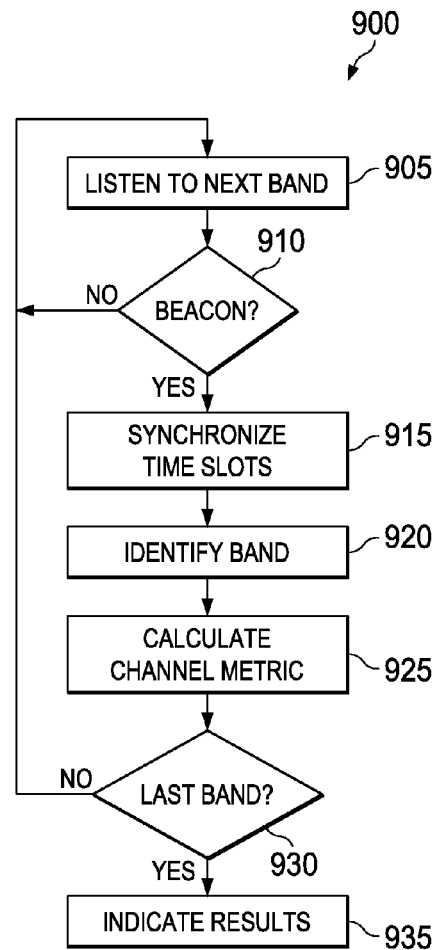

FIG. 9 is a flowchart of a passive listening method according to some embodiments.

FIG. 10 is a diagram of a single PLC device in passive listening mode according to some embodiments.

Figure 11:
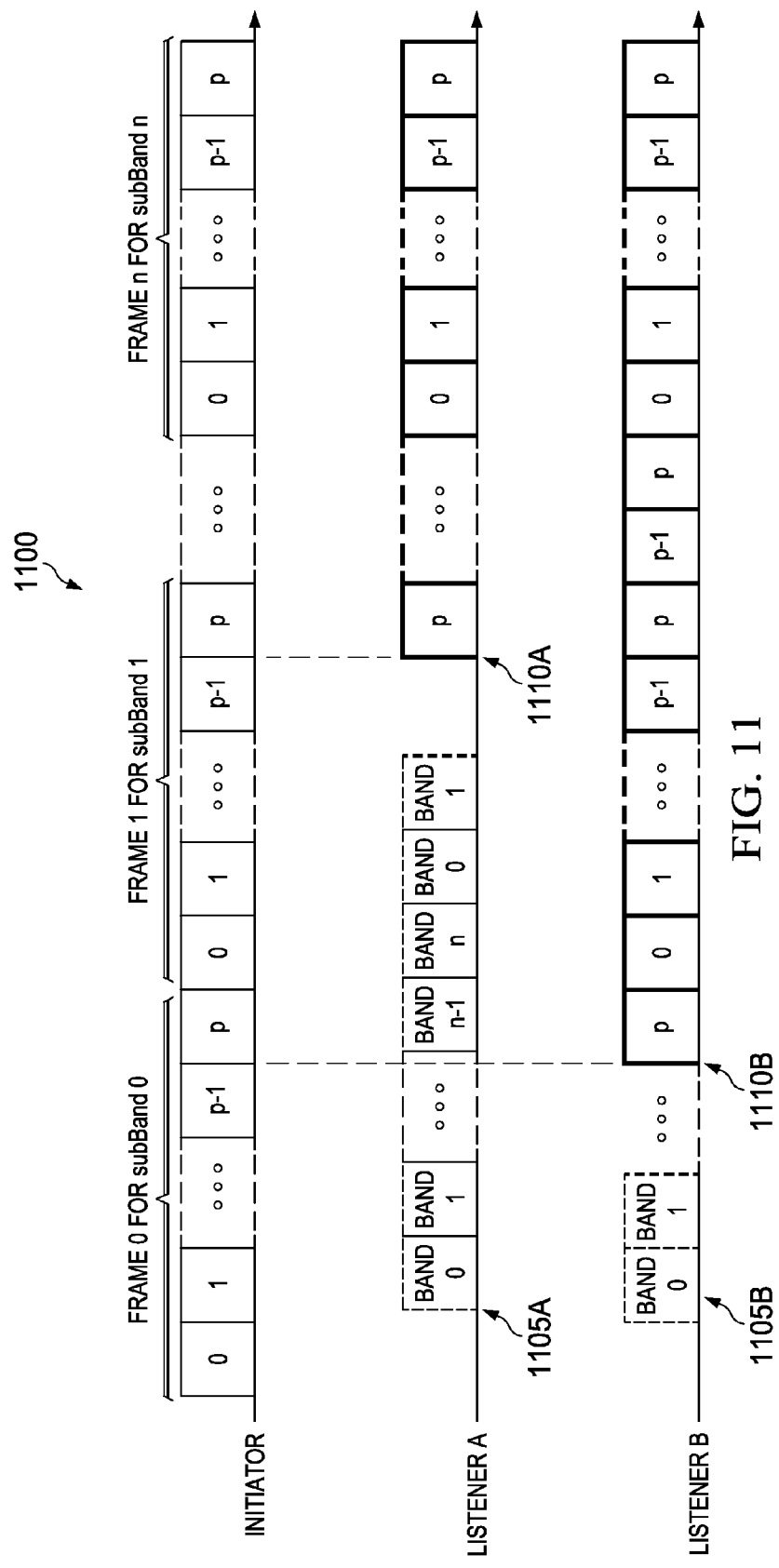

FIG. 11 is a diagram of multiple PLC devices operating in passive listening mode according to some embodiments.

Figure 12:
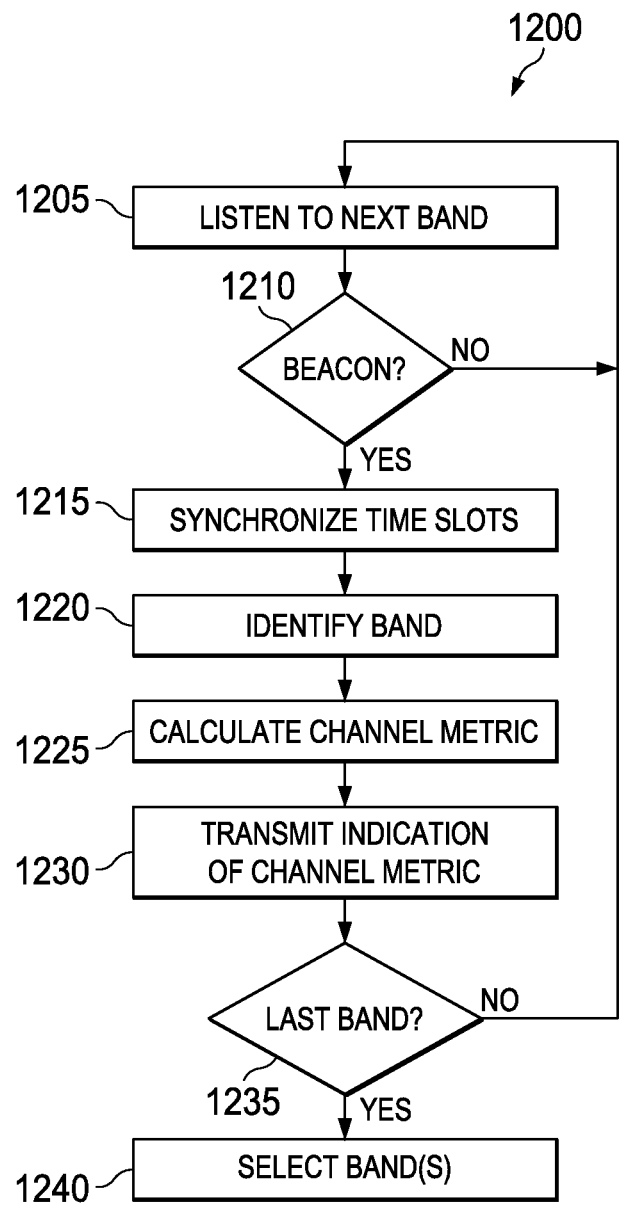

FIG. 12 is a flowchart of an active listening method according to some embodiments.

Figure 13:
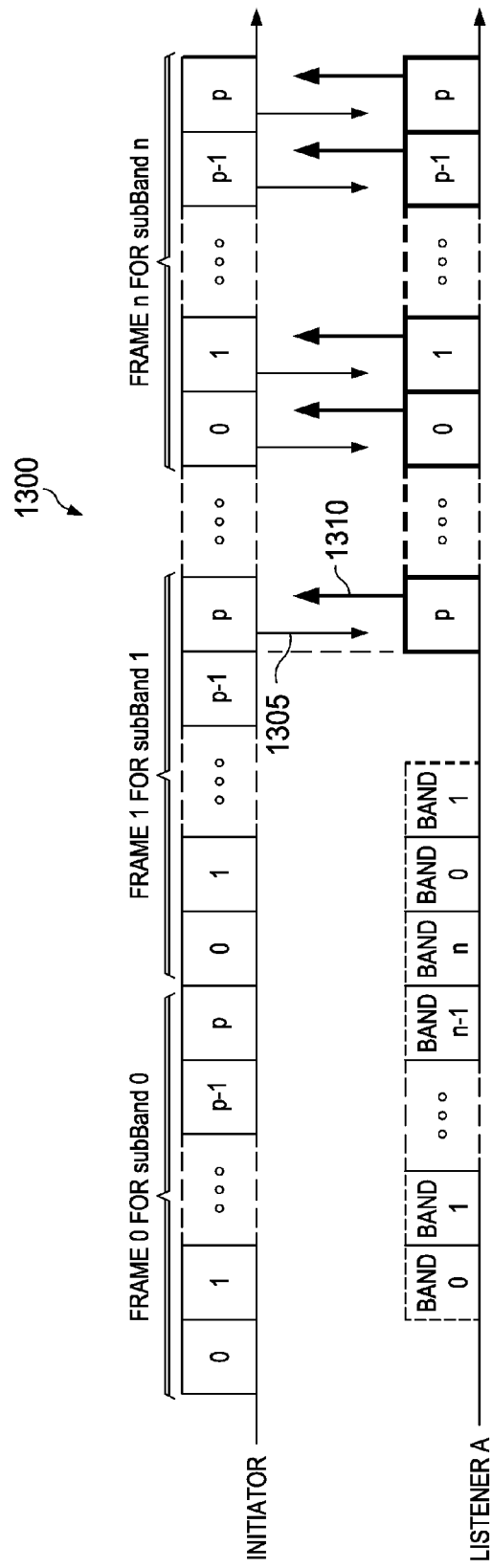

FIG. 13 is a diagram of a single PLC device in active listening mode according to some embodiments.

Figure 14:
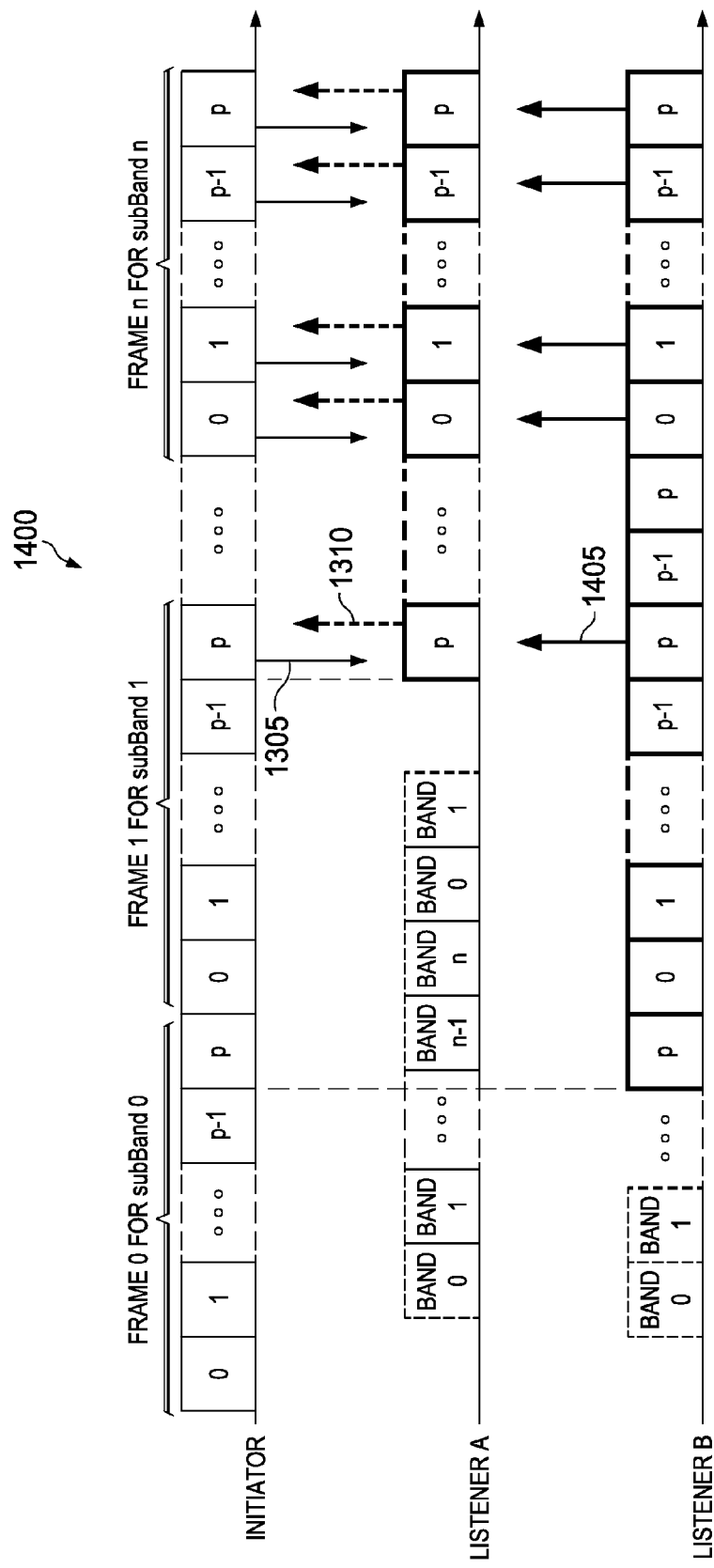

FIG. 14 is a diagram of multiple PLC devices operating in active listening mode according to some embodiments.

Figure 15:
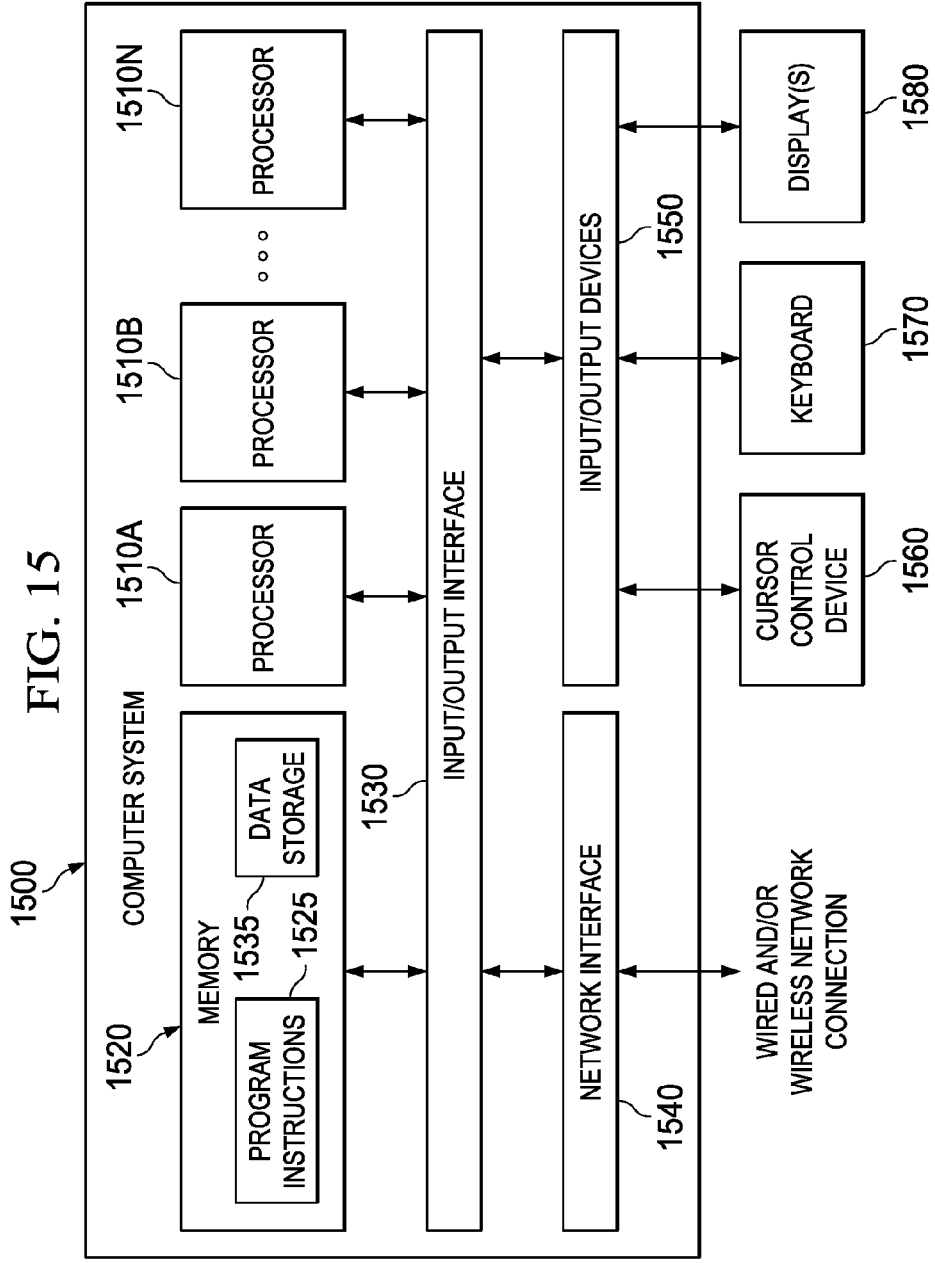

FIG. 15 is a block diagram of a computing system configured to implement certain systems and methods described herein according to some embodiments.

DETAILED DESCRIPTION

The invention(s) now will be described more fully hereinafter with reference to the accompanying drawings. The invention(s) may, however, be embodied in many different forms and should not be construed as limited to the embodiments set forth herein. Rather, these embodiments are provided so that this disclosure will be thorough and complete, and will fully convey the scope of the invention(s) to a person of ordinary skill in the art. A person of ordinary skill in the art may be able to use the various embodiments of the invention (s).

Turning to FIG. 1, an electric power distribution system is depicted according to some embodiments. Medium voltage (MV) power lines 103 from substation 101 typically carry voltage in the tens of kilovolts range. Transformer 104 steps the MV power down to low voltage (LV) power on LV lines 105, carrying voltage in the range of 100-240 VAC. Transformer 104 is typically designed to operate at very low frequencies in the range of 50-60 Hz. Transformer 104 does not typically allow high frequencies, such as signals greater than 100 KHz, to pass between LV lines 105 and MV lines 103. LV lines 105 feed power to customers via meters 106*a-n*, which are typically mounted on the outside of residences 102*a-n*. (Although referred to as "residences," premises 102*a-n* may include any type of building, facility or location where electric power is received and/or consumed.) A breaker panel, such as panel 107, provides an interface between meter 106*n* and electrical wires 108 within residence 102*n*. Electrical wires 108 deliver power to outlets 110, switches 111 and other electric devices within residence 102*n*.

The power line topology illustrated in FIG. 1 may be used to deliver high-speed communications to residences 102*a-n*. In some implementations, power line communications modems or gateways 112*a-n* may be coupled to LV power lines 105 at meter 106*a-n*. PLC modems/gateways 112*a-n* may be used to transmit and receive data signals over MV/LV lines 103/105. Such data signals may be used to support metering and power delivery applications (e.g., smart grid applications), communication systems, high speed Internet, telephony, video conferencing, and video delivery, to name a few. By transporting telecommunications and/or data signals over a power transmission network, there is no need to install new cabling to each subscriber 102*a-n*. Thus, by using existing electricity distribution systems to carry data signals, significant cost savings are possible.

An illustrative method for transmitting data over power lines may use, for example, a carrier signal having a frequency different from that of the power signal. The carrier signal may be modulated by the data, for example, using an orthogonal frequency division multiplexing (OFDM) scheme or the like.

PLC modems or gateways 112a-n at residences 102a-n use the MV/LV power grid to carry data signals to and from PLC data concentrator 114 without requiring additional wiring. Concentrator 114 may be coupled to either MV line 103 or LV line 105. Modems or gateways 112a-n may support applications such as high-speed broadband Internet links, narrowband control applications, low bandwidth data collection applications, or the like. In a home environment, for example, modems or gateways 112a-n may further enable home and building automation in heat and air conditioning, lighting, and security. Also, PLC modems or gateways 112a-n may enable AC or DC charging of electric vehicles and other appliances. An example of an AC or DC charger is illustrated as PLC device 113. Outside the premises, power line communication networks may provide street lighting control and remote power meter data collection.

One or more data concentrators 114 may be coupled to control center 130 (e.g., a utility company) via network 120. Network 120 may include, for example, an IP-based network, the Internet, a cellular network, a WiFi network, a WiMax network, or the like. As such, control center 130 may be configured to collect power consumption and other types of relevant information from gateway(s) 112 and/or device(s) 113 through concentrator(s) 114. Additionally or alternatively, control center 130 may be configured to implement smart grid policies and other regulatory or commercial rules by communicating such rules to each gateway(s) 112 and/or device(s) 113 through concentrator(s) 114.

In some embodiments, each concentrator 114 may be seen as a base node for a PLC domain, each such domain comprising downstream PLC devices that communicate with control center 130 through a respective concentrator 114. For example, in FIG. 1, device 106a-n, 112a-n, and 113 may all be considered part of the PLC domain that has data concentrator 114 as its base node; although in other scenarios other devices may be used as the base node of a PLC domain. In a typical situation, multiple nodes may be deployed in a given PLC network, and at least a subset of those nodes may be tied to a common clock through a backbone (e.g., Ethernet, digital subscriber loop (DSL), etc.).

Still referring to FIG. 1, meter 106, gateways 112, PLC device 113, and data concentrator 114 may each be coupled to or otherwise include a PLC modem or the like. The PLC modem may include transmitter and/or receiver circuitry to facilitate the device's connection to power lines 103, 105, and/or 108.

FIG. 2 is a block diagram of PLC device or modem 113 according to some embodiments. As illustrated, AC interface 201 may be coupled to electrical wires 108a and 108b inside of premises 112n in a manner that allows PLC device 113 to switch the connection between wires 108a and 108b off using a switching circuit or the like. In other embodiments, however, AC interface 201 may be connected to a single wire 108 (i.e., without breaking wire 108 into wires 108a and 108b) and without providing such switching capabilities. In operation, AC interface 201 may allow PLC engine 202 to receive and transmit PLC signals over wires 108a-b. As noted above, in some cases, PLC device 113 may be a PLC modem. Additionally or alternatively, PLC device 113 may be a part of a smart grid device (e.g., an AC or DC charger, a meter, etc.), an appliance, or a control module for other electrical elements located inside or outside of premises 112n (e.g., street lighting, etc.).

PLC engine 202 may be configured to transmit and/or receive PLC signals over wires 108a and/or 108b via AC interface 201 using a particular channel or frequency band. In some embodiments, PLC engine 202 may be configured to transmit OFDM signals, although other types of modulation schemes may be used. As such, PLC engine 202 may include or otherwise be configured to communicate with metrology or monitoring circuits (not shown) that are in turn configured to measure power consumption characteristics of certain devices or appliances via wires 108, 108a, and/or 108b. PLC engine 202 may receive such power consumption information, encode it as one or more PLC signals, and transmit it over wires 108, 108a, and/or 108b to higher-level PLC devices (e.g., PLC gateways 112n, data concentrators 114, etc.) for further processing. Conversely, PLC engine 202 may receive instructions and/or other information from such higher-level PLC devices encoded in PLC signals, for example, to allow PLC engine 202 to select a particular frequency band in which to operate.

In various embodiments, PLC device 113 may be implemented at least in part as an integrated circuit. FIG. 3 is a block diagram of such an integrated circuit. In some cases, one or more of meter 106, gateway 112, PLC device 113, or data concentrator 114 may be implemented similarly as shown in FIG. 3. For example, integrated circuit 302 may be a digital signal processor (DSP), an application specific integrated circuit (ASIC), a system-on-chip (SoC) circuit, a field-programmable gate array (FPGA), a microprocessor, a microcontroller, or the like. As such, integrated circuit 302 may implement, at least in part, at least a portion of PLC engine 202 shown in FIG. 2. Integrated circuit 302 is coupled to one or more peripherals 304 and external memory 303. Further, integrated circuit 302 may include a driver for communicating signals to external memory 303 and another driver for communicating signals to peripherals 304. Power supply 301 is also provided which supplies the supply voltages to integrated circuit 302 as well as one or more supply voltages to memory 303 and/or peripherals 304. In some embodiments, more than one instance of integrated circuit 302 may be included (and more than one external memory 303 may be included as well).

Peripherals 304 may include any desired circuitry, depending on the type of PLC device or system. For example, in some embodiments, peripherals 304 may implement, at least in part, at least a portion of a PLC modem (e.g., portions of AC interface 210 shown in FIG. 2). Peripherals 304 may also include additional storage, including RAM storage, solid-state storage, or disk storage. In some cases, peripherals 304 may include user interface devices such as a display screen, including touch display screens or multi-touch display screens, keyboard or other input devices, microphones, speakers, etc. External memory 303 may include any type of memory. For example, external memory 303 may include SRAM, nonvolatile RAM (NVRAM, such as "flash" memory), and/or dynamic RAM (DRAM) such as synchronous DRAM (SDRAM), double data rate (DDR, DDR2, DDR3, etc.) SDRAM, etc. External memory 303 may include one or more memory modules to which the memory devices are mounted, such as single inline memory modules (SIMMs), dual inline memory modules (DIMMs), etc.

In various implementations, PLC device or modem 113 may include transmitter and/or receiver circuits configured to connect to power lines 103, 105, and/or 108. FIG. 4 illustrates the connection between the power line communication transmitter and/or receiver circuitry to the power lines according to some embodiments. PLC transmitter/receiver 401 may function as the transmitter and/or receiver circuit. PLC transmitter/receiver 401 generates pre-coded signals for transmission over the power line network. Each output signal, which may be a digital signal, is provided to a separate line driver circuit 402A-C. Line drivers 402A-C comprise, for example, digital-to-analog conversion circuitry, filters, and/or line drivers that couple signals from PLC transmitter/receiver 401 to power lines 403A-C. Transformer 404 and coupling capacitor 405 link each analog circuit/line driver 402 to its respective power line 403A-C. Accordingly, in the embodiment illustrated in FIG. 4, each output signal is independently linked to a separate, dedicated power line.

FIG. 4 further illustrates an alternate receiver embodiment. Signals are received on power lines 403A-C, respectively. In an embodiment, each of these signals may be individually received through coupling capacitors 405, transformers 404, and line drivers 402 to PLC transmitter/receiver 401 for detection and receiver processing of each signal separately. Alternatively, the received signals may be routed to summing filter 406, which combines all of the received signals into one signal that is routed to PLC transmitter/receiver 401 for receiver processing.

FIG. 5 illustrates an alternative embodiment in which PLC transmitter/receiver 501 is coupled to a single line driver 502, which is in turn coupled to power lines 503A-C by a single transformer 504. All of the output signals are sent through line driver 502 and transformer 504. Switch 506 selects which power line 503A-C receives a particular output signal. Switch 506 may be controlled by PLC transmitter/receiver 501. Alternatively, switch 506 may determine which power line 503A-C should receive a particular signal based upon information, such as a header or other data, in the output signal. Switch 506 links line driver 502 and transformer 504 to the selected power line 503A-C and associated coupling capacitor 505. Switch 506 also may control how received signals are routed to PLC transmitter/receiver 501.

FIG. 6 is similar to FIG. 5 in which PLC transmitter/receiver 1901 is coupled to a single line driver 1902. However, in the embodiment of FIG. 6, power lines 603A-C are each coupled to a separate transformer 604 and coupling capacitor 605. Line driver 602 is coupled to the transformers 604 for each power line 603 via switch 606. Switch 606 selects which transformer 604, coupling capacitor 605, and power line 603A-C receives a particular signal. Switch 606 may be controlled by PLC transmitter/receiver 601, or switch 606 may determine which power line 603A-C should receive a particular signal based upon information, such as a header or other data, in each signal. Switch 606 also may control how received signals are routed to PLC transmitter/receiver 601.

In some embodiments, the systems described above (and/or the computer system shown in FIG. 15) may be configured to select and/or facilitate the selection of one or more channels or frequency bands of operation. Generally speaking, a PLC device in a PLC network may be configured to transmit signals (i.e., uplink) in one or more bands of a first set of frequency bands or subbands. The same PLC device may be configured to receive signals (i.e., downlink) in one or more bands of a second set of frequency bands or subbands. In some implementations, the first set of frequency bands may be at least in part distinct with respect to the second set of frequency bands. In other implementations, the first set of frequency bands may be completely non-overlapping with respect to the second set. Furthermore, during operation, a given PLC device may be configured to monitor conditions in the frequency band (or set of bands) currently in use, and, upon detecting a worsening or degradation of those conditions, the PLC device may automatically switch its transmission and/or reception to a more suitable frequency band (or set of bands).

In various embodiments, in order to select or facilitate the selection of frequency bands, two or more PLC devices may communicate with each other to exchange information sufficient to calculate or estimate channel conditions in the uplink and/or downlink directions. For example, first and second PLC devices may take turns acting as "initiator" and "listener." In a first mode of operation, the first PLC device may act as initiator and may be configured to create and transmit "superframes" over a power line, as described below with respect to FIGS. 7 and 8. Upon receipt of at least a portion of a superframe, the second PLC device (configured to act as a listener) may measure or estimate the channel conditions in each band, and select appropriate frequency band(s) and/or indicate the selection, for example, to a human operator (referred to as "passive listening" and described in FIGS. 9-11). Additionally or alternatively, the second PLC device may transmit an indication of the channel conditions and/or an indication of the selected frequency band(s) to the first PLC device (referred to as "active listening" as described in FIGS. 12-14). As such, the first and/or second PLC devices select the appropriate frequency band(s) to communicate in the direction from the first PLC device to the second PLC device. Then, in second mode of operation, the first PLC device and the second PLC device may switch roles and repeat the same or a similar process in the reverse direction. Accordingly, the first and/or second PLC devices may also identify a suitable frequency band(s) for subsequent communications in the direction from the second PLC device to the first PLC device. As previously noted, the channel selection process may be repeated periodically and/or in response to a change in channel conditions.

Turning now to FIGS. 7 and 8, a method for creating a superframe is depicted. In some embodiments, method 700 may be performed by a computer system, PLC device, PLC modem, or the like. At block 705, method 700 may define a time slot. The length of such a slot is configurable, and may be longer than the length of a beacon packet (a packet configured to inform a PLC device that another PLC device is active). At block 710, method 700 may define a plurality of frames, each of the frames having a plurality of time slots. For instance, in the example shown in FIG. 8, frames 0-n each have p slots, where n and p are integers. At block 715, method 700 may create a plurality of bandscan packets. In some implementations, each bandscan packet may include a band index and a slot index. Specifically, the slot index may indicate a position of a time slot within a respective frame and the band index may indicate one of the plurality of different frequency bands with which the frame is associated, as discussed below.

At block 720, method 700 may insert a beacon packet and a bandscan packet in each time slot of each frame. For example, a bandscan packet inserted in the third time slot of the second frame may have a slot index of 3 and a band index of 2, whereas another bandscan packet inserted in the sixth time slot of the fourth frame may have a slot index of 6 and a frame index of 4. At block 725, method 700 may associate each frame with a given frequency band or channel, and at block 730 these various frames 0-n may be assembled into bandscan superframe 800, as shown in FIG. 8.

In a first mode of operation, an initiator (e.g., a transmitting PLC device) may create a superframe, for example, as outlined in FIG. 7, and may transmit the superframe over a power line. In some cases, the whole superframe may be repeated a predetermined number of times to allow a listener (e.g., a receiving PLC device) to develop a complete channel quality report for the frequency bands (in the direction from the initiator to the listener). Although each time slot is described as including two packets (i.e., a beacon packet and a bandscan packet), in some cases these two packets may be combined into one or split into three or more packets. Moreover, in addition to slot and frame index information, each bandscan packet may also include other data such as, for example, an identification of the transmitting device, channel quality information (e.g., in the direction from the listener to the initiator for example, generated in previous determinations, etc.).

FIG. 9 is a flowchart of a passive listening method. In some embodiments, method 900 may be performed by a computer system, PLC device, PLC modem, or the like. At block 905, method 900 may begin listening for beacon packets or the like received in a selected frequency band or channel. At block 910, method 900 may determine whether a beacon packet has been received in the selected frequency band. If not, control returns to block 905 and method 900 may listen for beacon packets in a subsequent channel frequency band. In some embodiments, block 905 may cause the PLC device to listen in the selected frequency band for a length of time equal to a time slot. Alternatively, the PLC device may listen in the same frequency band for a length of time longer than a time slot (e.g., slightly longer than a time slot, twice the length of a time slot, three times the length of the time slot, etc.).

If method 900 detects a beacon packet at block 910, then it may use the arrival time of the beacon packet (plus known information about the length of the packet) to synchronize the receipt of packets in additional or subsequent time slots. This implementation may be particularly useful, for example, in situations where the listener and the initiator do not have synchronized clocks. In cases where their clocks are synchronized, however, block 915 may be optional. At block 920, method 900 may identify the band to which the received packet(s) belong. In some implementations, the band may be known and equal to the band scanned in block 905. In other situations, the identity of the band may be extracted from received packet(s) (e.g., the band index of a given bandscan packet).

At block 925, method 900 may include calculating or estimating a channel metric. For example, the listener device may calculate or estimate the signal-to-noise ratio (SNR) and/or bit error rate (BER) of the channel by comparing received packet(s) in that channel to expected packets (i.e., in the absence of noise and/or other impairments). At block 930, method 900 may determine whether the selected frequency band is the last to be evaluated. If not, control returns to block 905 and a subsequent channel or frequency band may be evaluated. Otherwise, method 900 may indicate the results at block 935.

In some embodiments, the results of block 935 may include the channel metric for each channel or frequency band. Additionally or alternatively, the results may identify frequency bands ranked from best to worst in terms of channel metric (e.g., highest to lowest SNR, lowest to highest BER, etc.). Moreover, in some cases, the listener device may be configured to utilize two or more frequency bands simultaneously, and the results of block 935 may therefore identify a set of bands to be used in subsequent communications.

As a hypothetical example, assume that there are 4 possible frequency bands (i.e., n=4) and that the listener device, upon receiving one or more superframes from the initiator device, has calculated or estimated the following channel metrics for each band: $SNR_{BAND1}$=2.0 dB, $SNR_{BAND2}$=3.0 dB, $SNR_{BAND3}$=4.0 dB, and $SNR_{BAND4}$=6.0 dB. In this case, if the bandwidth of band 4 is sufficient to enable communications between the initiator and the listener, then the results of block 935 may select band 4 because it has the best channel metric (in this case, the highest SNR). If, however, the bandwidth of band 4 is not sufficient to enable communications, then bands 4 and 3 may be selected. More generally, the number of channels or bands selected as a result of method 900 may depend upon the bandwidth required by the listener and/or transmitting device, which in turn may depend upon the type of device and/or protocol or standard being used.

In some implementations, once results are determined and/or gathered in block 935, those results may be communicated to a human operator. The human operator may then manually coordinate (e.g., with another human operator) the operation of the initiator device so that, in subsequent communications with the listener device, the initiator device may be configured to use the channel(s) or band(s) indicated in block 935 (i.e., in the direction from the initiator device to the listener device). In other embodiments, the results of block 935 may be communicated via the power line back to the initiator device; thus avoiding human interaction. For example, the listener device may transmit a ranked list of channels to the initiator, and the initiator may locally execute a band selection algorithm similar or identical to the algorithm performed by the listener device in processing the ranked list. Additionally or alternatively, the listener device may transmit its channel or band selection to the initiator directly.

FIG. 10 is a diagram of a single PLC device in passive listening mode according to some embodiments. In this case, the initiator transmits a bandscan superframe with frames 0-n, each frame having 0-p time slots. Meanwhile, a listener device scans each band 0-n for the duration of a time slot. In this example, assume that band 0 is not usable due to highly degraded signal conditions. Hence, although the initiator is transmitting frame 0 over frequency band 0 at the same time when the listener scans band 0 at time slot 1005, frame 0 is nonetheless not detectable by the listener.

After transmitting frame 0 over band 0, however, the initiator begins transmitting frame 1 over band 1 while the listener continues to sequentially scan each channel or band. Also assume, in this example, that band 1 is usable. Thus, at time slot 1010, the listener scans band 1 (while the initiator is still transmitting frame 1 over band 1) and therefore detects one or more packets "p-1" (e.g., a beacon packet). Upon detecting the first beacon packet, the listener may then determine, based at least in part upon the length of each time slot, the beginning of the subsequent time slot "p" 1015, thus synchronizing the reception of additional or subsequent packets. Moreover, based on the time slot index of the first received bandscan packet, the listener can determine when to switch to the subsequent channel, thus also synchronizing subsequent band selection. In cases where the listener cannot detect a beacon packet after scanning bands for a duration equal to or greater than that of a superframe, that may suggest that none of the bands is suitable for use from the initiator to the listener.

FIG. 11 is a diagram of multiple PLC devices operating in passive listening mode according to some embodiments. Scenario 1100 is similar to scenario 1000 described in FIG. 10, but with two listener devices A and B operating concurrently on the same power line (any number of listening devices may be used). In this case, both listeners A and B miss frame 0 at time slots 1105A and B, respectively. However, listener B detects a first beacon packet during transmission of frame 0 and syncs subsequent packets at 1110B. Listener A detects a beacon packet during transmission of frame 1, and syncs subsequent packets at 1110A.

FIG. 12 is a flowchart of an active listening mode of operation according to some embodiments. Particularly, blocks 1205-1225 of method 1200 may be similar to blocks 1105-1125 of method 1100 in FIG. 11. Here, however, method 1200 may transmit an indication of the estimated or calculated channel metric back to the initiator at block 1230 in the form of an "echo" packet or the like. The echo packet may be transmitted to the initiator, for example, in the same band or channel where the beacon packet was received. In some implementations, the echo packet may include a report of channel conditions in the direction from the initiator to the listener. The initiator may also use the echo packet to estimate channel conditions in the direction from the listener to the initiator. After the last band is scanned, the listener device may select one or more bands at block 1240. Moreover, after a complete superframe duration, both the initiator and the listener nodes may have a channel condition report in the relevant direction. That is, beacon or bandscan packets may include channel metrics for the direction from the listener to the initiator (as determined by the initiator) and echo packets may include channel metrics for the direction from the initiator to the listener (as determined by the listener).

FIG. 13 is a diagram of a single PLC device in active listening mode according to some embodiments. Specifically, diagram 1300 may be similar to diagram 1000 of FIG. 10. However, every time the initiator transmits a time slot 1305 after synchronization, the listener device transmits one or more echo packets back to the initiator indicating a current, previous, or accumulated channel quality metric. For example, in some implementations, the listener device may transmit the channel quality metric based on the current or last received packet or subset of packets for the present frame. In other implementations, the listener device may transmit the channel quality metric for every channel measured up to that point i.e., a cumulative report. In yet other implementations, the listener device may transmit an indication of the current channel selection (as an alternative or in addition to the quality metrics).

FIG. 14 is a diagram of multiple PLC devices operating in active listening mode according to some embodiments. Scenario 1400 is similar to scenario 1300 described in FIG. 13, but with two listener devices A and B operating concurrently on the same power line (any number of listening devices may be used). In this case, both listeners A and B transmit echo packets to the initiator device at slots 1310 and 1405 containing their respective channel metric measurements and/or band selection(s). To avoid collision between these two or more transmissions, the time at which listeners A and B transmit their respective echo packets may be determined using a Round Robin algorithm or the like. Additionally or alternatively, listeners A and B may employ a Carrier Sense Multiple Access (CSMA) technique or the like.

As noted above, in certain embodiments, systems and methods for channel selection may be implemented or executed by one or more PLC devices and/or computer systems. One such computer system is illustrated in FIG. 15. In various embodiments, system 1500 may be implemented as a PLC device, PLC modem, PLC data concentrator, server, a mainframe computer system, a workstation, a network computer, a desktop computer, a laptop, mobile device, or the like. In different embodiments, these various systems may be configured to communicate with each other in any suitable way, such as, for example, via a local area network or the like.

As illustrated, system 1500 includes one or more processors 1510 coupled to a system memory 1520 via an input/output (I/O) interface 1530. Computer system 160 further includes a network interface 1540 coupled to I/O interface 1530, and one or more input/output devices 1525, such as cursor control device 1560, keyboard 1570, display(s) 1580, and/or mobile device 1590. In various embodiments, computer system 1500 may be a single-processor system including one processor 1510, or a multi-processor system including two or more processors 1510 (e.g., two, four, eight, or another suitable number). Processors 1510 may be any processor capable of executing program instructions. For example, in various embodiments, processors 1510 may be general-purpose or embedded processors implementing any of a variety of instruction set architectures (ISAs), such as the x815, POWERPC®, ARM®, SPARC®, or MIPS® ISAs, or any other suitable ISA. In multi-processor systems, each of processors 1510 may commonly, but not necessarily, implement the same ISA. Also, in some embodiments, at least one processor 1510 may be a graphics processing unit (GPU) or other dedicated graphics-rendering device.

System memory 1520 may be configured to store program instructions and/or data accessible by processor 1510. In various embodiments, system memory 1520 may be implemented using any suitable memory technology, such as static random access memory (SRAM), synchronous dynamic RAM (SDRAM), nonvolatile/Flash-type memory, or any other type of memory. As illustrated, program instructions and data implementing certain operations such as, for example, those described in the figures above, may be stored within system memory 1520 as program instructions 1525 and data storage 1535, respectively. In other embodiments, program instructions and/or data may be received, sent or stored upon different types of computer-accessible media or on similar media separate from system memory 1520 or computer system 1500. Generally speaking, a computer-accessible medium may include any tangible storage media or memory media such as magnetic or optical media e.g., disk or CD/DVD-ROM coupled to computer system 1500 via I/O interface 1530. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 1540.

In one embodiment, I/O interface 1530 may be configured to coordinate I/O traffic between processor 1510, system memory 1520, and any peripheral devices in the device, including network interface 1540 or other peripheral interfaces, such as input/output devices 1550. In some embodiments, I/O interface 1530 may perform any necessary protocol, timing or other data transformations to convert data signals from one component (e.g., system memory 1520) into a format suitable for use by another component (e.g., processor 1510). In some embodiments, I/O interface 1530 may include support for devices attached through various types of peripheral buses, such as a variant of the Peripheral Component Interconnect (PCI) bus standard or the Universal Serial Bus (USB) standard, for example. In some embodiments, the function of I/O interface 1530 may be split into two or more separate components, such as a north bridge and a south bridge, for example. In addition, in some embodiments some or all of the functionality of I/O interface 1530, such as an interface to system memory 1520, may be incorporated directly into processor 1510.

Network interface 1540 may be configured to allow data to be exchanged between computer system 1500 and other devices attached to a network, such as other computer systems, or between nodes of computer system 1500. In various embodiments, network interface 1540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1550 may, in some embodiments, include one or more display terminals, keyboards, keypads, touchpads, scanning devices, voice or optical recognition devices, mobile devices, or any other devices suitable for entering or retrieving data by one or more computer system 1500. Multiple input/output devices 1550 may be present in computer system 1500 or may be distributed on various nodes of computer system 1500. In some embodiments, similar input/output devices may be separate from computer system 1500 and may interact with one or more nodes of computer system 1500 through a wired or wireless connection, such as over network interface 1540.

As shown in FIG. 15, memory 1520 may include program instructions 1525, configured to implement certain embodiments described herein, and data storage 1535, comprising various data accessible by program instructions 1525. In an embodiment, program instructions 1525 may include software elements of embodiments illustrated in the above figures. For example, program instructions 1525 may be implemented in various embodiments using any desired programming language, scripting language, or combination of programming languages and/or scripting languages (e.g., C, C++, C#, JAVA®, JAVASCRIPT®, PERL®, etc.). Data storage 1535 may include data that may be used in these embodiments (e.g., recorded communications, profiles for different modes of operations, etc.). In other embodiments, other or different software elements and data may be included.

A person of ordinary skill in the art will appreciate that computer system 1500 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

It will be understood that various operations discussed herein may be executed simultaneously and/or sequentially. It will be further understood that each operation may be performed in any order and may be performed once or repetitiously. In various embodiments, the operations discussed herein may represent sets of software routines, logic functions, and/or data structures that are configured to perform specified operations. Although certain operations may be shown as distinct logical blocks, in some embodiments at least some of these operations may be combined into fewer blocks. Conversely, any given one of the blocks shown herein may be implemented such that its operations may be divided among two or more logical blocks. Moreover, although shown with a particular configuration, in other embodiments these various modules may be rearranged in other suitable ways.

Many of the operations described herein may be implemented in hardware, software, and/or firmware, and/or any combination thereof. When implemented in software, code segments perform the necessary tasks or operations. The program or code segments may be stored in a processor-readable, computer-readable, or machine-readable medium. The processor-readable, computer-readable, or machine-readable medium may include any device or medium that can store or transfer information. Examples of such a processor-readable medium include an electronic circuit, a semiconductor memory device, a flash memory, a ROM, an erasable ROM (EROM), a floppy diskette, a compact disk, an optical disk, a hard disk, a fiber optic medium, etc. Software code segments may be stored in any volatile or non-volatile storage device, such as a hard drive, flash memory, solid state memory, optical disk, CD, DVD, computer program product, or other memory device, that provides tangible computer-readable or machine-readable storage for a processor or a middleware container service. In other embodiments, the memory may be a virtualization of several physical storage devices, wherein the physical storage devices are of the same or different kinds. The code segments may be downloaded or transferred from storage to a processor or container via an internal bus, another computer network, such as the Internet or an intranet, or via other wired or wireless networks.

Many modifications and other embodiments of the invention(s) will come to mind to one skilled in the art to which the invention(s) pertain having the benefit of the teachings presented in the foregoing descriptions, and the associated drawings. Therefore, it is to be understood that the invention(s) are not to be limited to the specific embodiments disclosed. Although specific terms are employed herein, they are used in a generic and descriptive sense only and not for purposes of limitation.

The invention claimed is:

1. A power line communication (PLC) device comprising:
a processor; and
a memory coupled to the processor, the memory configured to store program instructions executable by the processor to cause the PLC device to:
sequentially scan one or more time slots in each of a plurality of frequency bands;
detect a packet transmitted by a second PLC device to the PLC device over one of the plurality of frequency bands; and
synchronize additional packets received from the second PLC device across the plurality of frequency bands based, at least in part, upon the detected packet, wherein the additional packets are organized in a plurality of frames, each of the plurality of frames having been transmitted by the second PLC device to the PLC device over a respective one of the plurality of frequency bands, each frame having a plurality of time slots, and each time slot having a pair of beacon and bandscan packets, wherein the beacon packets are configured to inform the PLC device that the second PLC device is active and wherein each bandscan packet includes a slot index indicating a position of its time slot within its respective frame and a band index indicating a corresponding one of the plurality of frequency bands.

2. The PLC device of claim 1, wherein the processor includes a digital signal processor (DSP), an application specific integrated circuit (ASIC), a system-on-chip (SoC) circuit, a field-programmable gate array (FPGA), a microprocessor, or a microcontroller.

3. A power line communication (PLC) device comprising:
a processor; and a memory coupled to the processor, the memory configured to store program instructions executable by the processor to cause the PLC device to:
sequentially scan one or more time slots in each of a plurality of frequency bands;
calculate a channel quality metric for each of the plurality of frequency bands based, at least in part, upon respective ones of the plurality of frames;
detect a packet transmitted by a second PLC device to the PLC device over one of the plurality of frequency bands; and
synchronize additional packets received from the second PLC device across the plurality of frequency bands based, at least in part, upon the detected packet, wherein the additional packets are organized in a plurality of frames, each of the plurality of frames having been transmitted by the second PLC device to the PLC device over a respective one of the plurality of frequency bands, each frame having a plurality of time slots, and each time slot having a pair of beacon and bandscan packets.

4. The PLC device of claim 3, wherein the channel quality metric includes at least one of a signal-to-noise ratio (SNR) or bit error rate (BER) calculation or estimation.

5. The PLC device of claim 3, the program instructions further executable by the processor to cause the PLC device to:

transmit one or more packets to the second PLC device, each of the one or more packets corresponding to one of the plurality of time slots, and each of one or more packets including an indication of the channel quality metric.

6. The PLC device of claim 3, the program instructions further executable by the processor to cause the PLC device to:

determine when to transmit the one or more packets to the second PLC device based upon at least one of: a round-robin or a carrier sense multiple access (CSMA) technique.

* * * * *